Patented Jan. 13, 1953

2,625,489

UNITED STATES PATENT OFFICE 2,625,489

WEATHER-RESISTANT CONCRETE

Patrick J. Keating, Jr., Scarsdale, N. Y., assignor to The Texas Company, New York, N. Y., a corporation of Delaware No Drawing. Application April 13, 1949,
Serial No. 87,359

5 Claims. (Cl. 106—96)

This invention relates to cement and concrete of enhanced resistance to freezing and thawing.

The invention is concerned with the entrainment of air in cement and concerete to increase the resistance of the material to freezing and thawing and contemplates the incorporation of air in the material by means of paraffin wax emulsions and soaps of oxidized wax.

In accordance with the invention a soap of oxidized paraffin wax is added to the water employed in making the cement or concrete mix. Stable emulsions are formed with the soaps of the oxidized paraffin wax and when mixed with the cement or concrete function to entrain air in the mix in the form of finely divided disconnected bubbles. By incorporating air in the cement and concrete through the agency of these emulsions, it is found that a product of greatly enhanced resistance to freezing and thawing can be produced. In the preparation of weather-resistant concrete, it is generally considered desirable to incorporate in the concrete quantities of air amounting to some 3 to 6 per cent by volume. By means of the present invention such proportions of air in a highly divided and dispersed form through the aggregate mass can readily be obtained without any serious loss in compressive strength.

In preparing the air entraining agent oxidized paraffin wax is treated with a saponifying agent such as an alkali metal hydroxide to saponify acid components present in the oxidized wax and the resultant soap is added when making the cement or concrete mixture.

By way of example, an oxidized slack wax having a saponification number of 93 and a neutralization number of 41.8, was saponified with sodium hydroxide. A stable wax emulsion was prepared consisting of 30 per cent by weight of the soap product and 70 per cent of water. The emulsion had a Saybolt Furol viscosity at 77° F. of 30 seconds (after stirring, the material being thixotropic in nature).

Concrete mixes were prepared in accordance with the Standard Recommended Practice for the Design of Concrete Mixes (ACI No. 613–44, Journal of American Concrete Institute, Proceedings, volume 41, June 1945). The mixer was charged first with sand, then with Portland cement and finally with coarse aggregate. After 15 seconds of dry mixing the water containing the wax emulsion was added and the materials were mixed for about 2 to 3 minutes. Different amounts of wax emulsion were used and varying amounts of air were entrained in the concrete.

Another concrete mix was prepared in a manner similar to that of the preceding mixtures except that no air-entraining agent was added.

By way of example, 0.005 per cent by weight of the wax emulsion based on the cement content gave 3 per cent air entrainment by volume of the concrete and 0.014 per cent of the wax emulsion gave 6 per cent air entrainment. The compressive strength of the concrete with the 3 per cent air entrainment was 5080 pounds per square inch and with the 6 per cent air entrainment 4180 pounds per square inch, as compared with the control concrete mix to which no air entraining agent was added which had a compressive strength of 4950 pounds per square inch.

Samples of the concrete prepared with the wax emulsion were tested by the freezing and thawing test in which the samples were subjected to alternate freezing and thawing until they showed a weight loss of 20 per cent. The following table shows the amounts of air in the several samples and the corresponding number of cycles of freezing and thawing.

| Per cent air: | Cycles |
|---|---|
| 3 | 104 |
| 6 | 146 |
| 10 | 176 |

By way of comparison the control sample of concrete in the preparation of which no air entraining agent was used had a freezing and thawing test of 82 cycles.

Although a preferred embodiment of the invention has been described herein, it will be understood that various changes and modifications may be made therein, while securing to a greater or less extent some or all of the benefits of the invention, without departing from the spirit and scope thereof.

I claim:

1. A wet concrete mix adapted to yield upon hardening concrete of enhanced resistance to freezing and thawing and comprising as essential components Portland cement, aggregate and a paraffin wax emulsion formed by the admixture of water and a wax-soap mixture prepared by the oxidation of paraffin wax to form an oxidized wax product having a saponification number of about 93 and a neutralization number of about 41 and the saponification of said oxidized wax product with alkali metal hydroxide, said wax emulsion being present in a quantity of the order of 0.005–0.014% by weight of the Portland cement content.

2. A concrete of enhanced resistance to freezing and thawing made from a wet mix of Portland cement and aggregate containing a paraffin wax emulsion formed by the admixture of water and a wax-soap mixture prepared by the oxidation of paraffin wax to form an oxidized wax product having a saponification number of about 93 and a neutralization number of about 41 and the saponification of said oxidized wax product with alkali metal hydroxide, said wax emulsion being present in a quantity of the order of 0.005–0.014% by weight of the Portland cement content, and the wet mix having been hardened with entrained air.

3. The method of preparing concrete of enhanced resistance to freezing and thawing that comprises incorporating in a mix of Portland cement and aggregate a paraffin wax emulsion formed by the admixture of water and a wax-soap mixture prepared by the oxidation of slack wax to form an oxidized wax product having a saponification number of about 93 and a neutralization number of about 41 and the saponification of said oxidized wax product with sodium hydroxide, said wax emulsion being added in a quantity of the order of 0.005–0.014% by weight of the Portland cement content.

4. The method of preparing concrete of enhanced resistance to freezing and thawing that comprises incorporating in a mix of Portland cement and aggregate a paraffin wax emulsion formed by the admixture of water and a wax-soap mixture prepared by the oxidation of paraffin wax to form an oxidized wax product having a saponification number of about 93 and a neutralization number of about 41 and the saponification of said oxidized wax product with alkali metal hydroxide, said wax emulsion being added in a quantity of the order of 0.005–0.014% by weight of the Portland cement content.

5. A wet concrete mix adapted to yield upon hardening concrete of enhanced resistance to freezing and thawing and comprising as essential components Portland cement, aggregate and a paraffin wax emulsion formed by the mixture of water and a wax-soap mixture prepared by the oxidation of slack wax to form an oxidized wax product having a saponification number of about 93 and a neutralization number of about 41 and the saponification of said oxidized wax product with alkali metal hydroxide, said wax emulsion being present in a quantity of the order of 0.005–0.014% by weight of the Portland cement.

PATRICK J. KEATING, Jr.

REFERENCES CITED

The following references are of record in the file of this patent:

UNITED STATES PATENTS

| Number | Name | Date |
|---|---|---|
| 1,285,636 | Davidson | Nov. 26, 1918 |
| 2,337,671 | Linford et al. | Dec. 28, 1943 |